US012602330B2

(12) United States Patent (10) Patent No.: US 12,602,330 B2
Pan et al. (45) Date of Patent: Apr. 14, 2026

(54) METHOD AND APPARATUS, STORAGE MEDIUM, AND COMPUTER PROGRAM PRODUCT OF USING ROUTING INFORMATION IN PAGE TABLE ENTRY

(71) Applicant: Huawei Technologies Co., Ltd., Shenzhen (CN)

(72) Inventors: Wei Pan, Shenzhen (CN); Junping Luo, Shenzhen (CN); Tao Li, Shenzhen (CN); Kenneth Chong Yin Tan, Shenzhen (CN); Junlong Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/807,043

(22) Filed: Aug. 16, 2024

(65) Prior Publication Data

US 2024/0403224 A1 Dec. 5, 2024

Related U.S. Application Data

(63) Continuation of application No. PCT/CN2022/137088, filed on Dec. 7, 2022.

(30) Foreign Application Priority Data

Feb. 17, 2022 (CN) .......................... 202210146330.6

(51) Int. Cl.
G06F 12/1009 (2016.01)
(52) U.S. Cl.
CPC ................................. G06F 12/1009 (2013.01)

(58) Field of Classification Search
CPC ................................................... G06F 12/1009
See application file for complete search history.

(56) References Cited

U.S. PATENT DOCUMENTS

| | | | |
|---|---|---|---|
| 5,734,922 A | 3/1998 | Hagersten et al. | |
| 2002/0019921 A1 | 2/2002 | Hagersten et al. | |
| 2008/0086620 A1 | 4/2008 | Morris | |
| 2008/0301398 A1 | 12/2008 | Falik et al. | |
| 2014/0089572 A1* | 3/2014 | Koka .................. | G06F 12/1072 |
| | | | 711/147 |
| 2018/0173643 A1 | 6/2018 | Yu et al. | |

FOREIGN PATENT DOCUMENTS

| | | |
|---|---|---|
| CN | 105630727 A | 6/2016 |
| CN | 111290829 A | 6/2020 |
| CN | 112840327 A | 5/2021 |
| WO | 2023065767 A1 | 4/2023 |

OTHER PUBLICATIONS

"Intel 64 and IA-32 Architectures Software Developer's Manual," vol. 3 (3A, 3B, 3C, & 3D): System Programming Guide, Chapter 4 Paging, Jun. 2024, 1510 pages.

* cited by examiner

*Primary Examiner* — Chie Yew

(74) *Attorney, Agent, or Firm* — Conley Rose, P.C.

(57) ABSTRACT

A memory access method comprises adding routing information to a memory page table, so that a memory management unit (MMU) queries, in a process of performing address translation on a virtual address (VA), the memory page table to obtain the routing information. After querying the memory page table and obtaining a physical address (PA), the MMU may directly route the PA based on the routing information, whereby a system address decoder (SAD) is not needed for further decoding the PA.

20 Claims, 16 Drawing Sheets

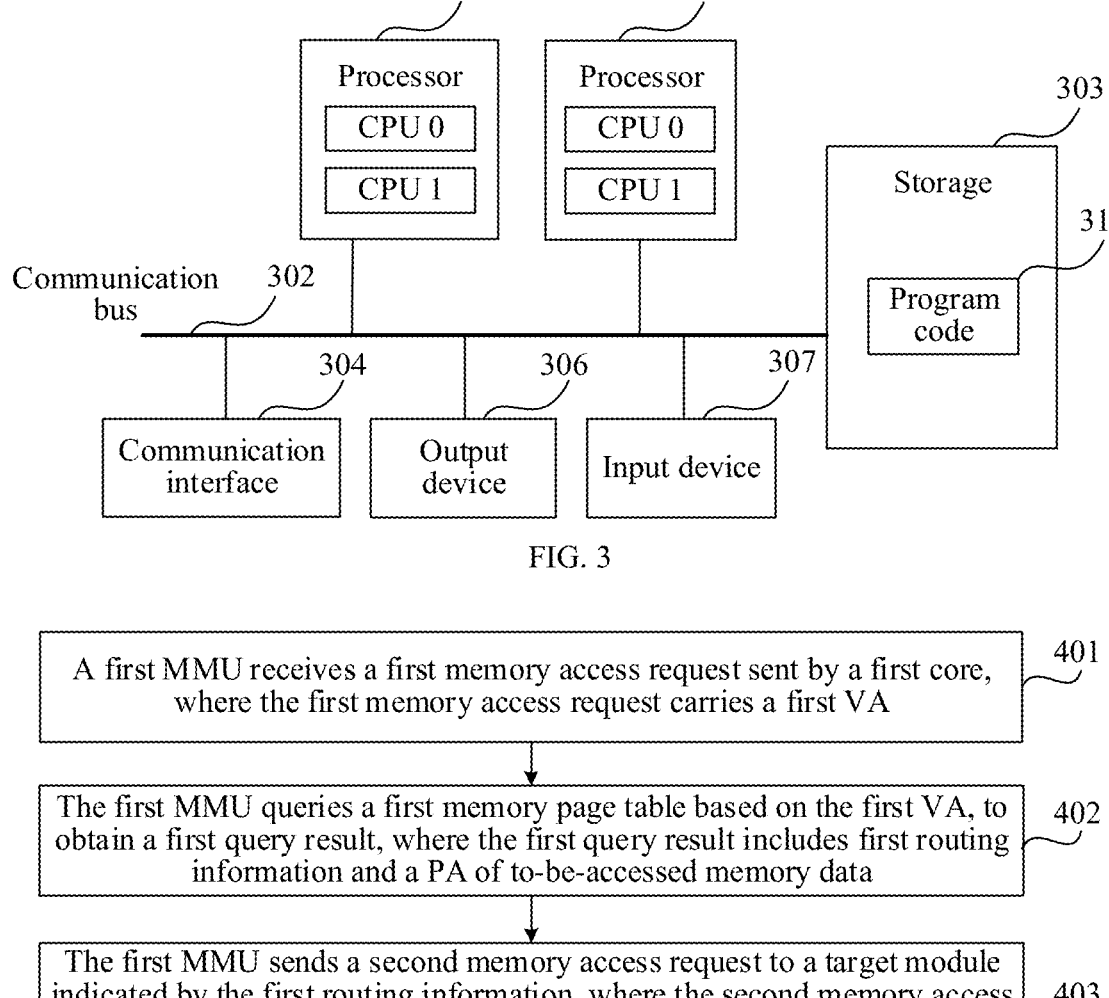

FIG. 3

A first MMU receives a first memory access request sent by a first core, where the first memory access request carries a first VA          401

The first MMU queries a first memory page table based on the first VA, to obtain a first query result, where the first query result includes first routing information and a PA of to-be-accessed memory data          402

The first MMU sends a second memory access request to a target module indicated by the first routing information, where the second memory access request carries the PA of the memory data, and the second memory access request indicates the target module to obtain the memory data based on the PA of the memory data and return the memory data to the first core          403

FIG. 4

| CR3 (conventional technology) | 63 | 62 | 61 | 60 | 59 | 58 | 57 | 56 | 55 | 54 | 53 | 52 | 51 | ... | M | M−1 | ... | 32 | 31 | 30 | ... | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|
| | Rsvd | | | | | | | | | | | | | Addr of PML4 or PML5 Tbl | | | | | | | | | | Ign. | | | | | | | | PCD | PWT | Ign. | |

FIG. 5

| CR3 (compatible with a conventional technology) | 63 | 62 | 61 | 60 | 59 | 58 | 57 | 56 | 55 | 54 | 53 | 52 | 51 | ... | M | M−1 | ... | 32 | 31 | 30 | ... | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|
| | Rsvd | | | | | | | | | | | | | | | Addr of PML4 or PML5 Tbl | | | | | | | Ign. | | | | | | | | PCD | PWT | Ign. | | 0 |

FIG. 6

| CR3 (where a SAD is not needed) | 63 | 62 | 61 | 60 | 59 | 58 | 57 | 56 | 55 | 54 | 53 | 52 | 51 | 50 | 49 | 48 | | 36 | 35 | 34 | 33 | 32 | 31 | 30 | | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|---|
| | LID (16) | | | | | | | | | | | | | | | | | CID (12) | | | | | | | ... | PA of 4 KB aligned PML4 or PML5 Tbl | | | | | Ign. | | | | | PCD | PWT | Ign. | 1 |

FIG. 7

| | 63 | 62 61 60 59 58 57 | 56 55 54 53 52 51 | ... | M | M−1 | ... | 32 31 30 | ... | 13 12 11 10 9 8 | 7 | 6 5 | 4 | 3 2 | 1 | 0 |
|---|---|---|---|---|---|---|---|---|---|---|---|---|---|---|---|---|
| PDPTE/ PDE (conventional technology) | XD3 | PK | Ign. | | | Rsvd | | Addr of 4 KB PF | | Ign. | PAT | D A | PCD PWT | U/S R/W | | |

FIG. 8

| PDPTE/PDE (compatible with a conventional technology) | 63 | 62 61 60 59 58 57 56 55 54 53 52 51 | ... | M M-1 | ... | 32 31 30 | ... | 13 12 11 10 9 8 | 7 | 6 | 5 | 4 | 3 | 2 | 1 | 0 |
|---|---|---|---|---|---|---|---|---|---|---|---|---|---|---|---|---|
|  | XD3 | PK | Ign. | Rsvd | Addr of 4 KB PF | | | Ign. | 0 | PAT | D | A | PCD | PWT | U/S | R/W | 1 |

FIG. 9

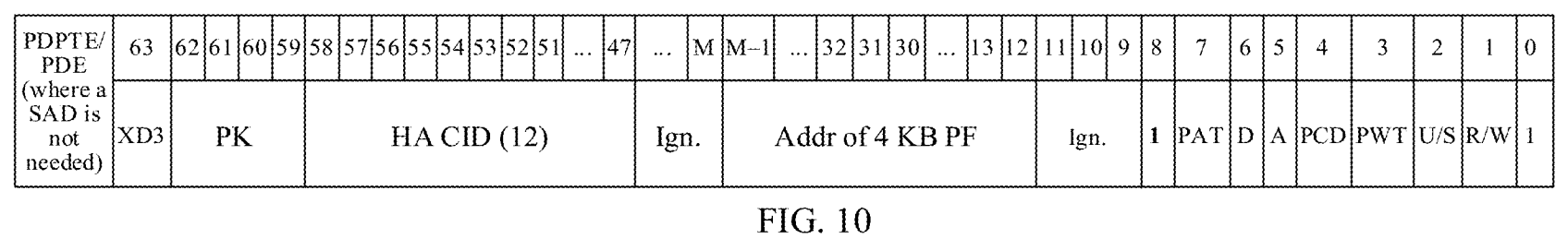

| | 63 | 62 61 60 59 58 | 57 56 55 54 53 52 51 ... 47 | ... | M M-1 ... 32 31 30 ... 13 12 | 11 10 9 8 | 7 | 6 | 5 | 4 | 3 | 2 | 1 | 0 |
|---|---|---|---|---|---|---|---|---|---|---|---|---|---|---|
| PDPTE/ PDE (where a SAD is not needed) | XD3 | PK | HA CID (12) | Ign. | Addr of 4 KB PF | Ign. | 1 | PAT | D | A | PCD | PWT | U/S | R/W | 1 |

FIG. 10

| PTE (conventional technology) | 63 | 62 | 61 | 60 | 59 | 58 | 57 | 56 | 55 | 54 | 53 | 52 | 51 | ... | M | M−1 | ... | 32 | 31 | 30 | ... | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|
| | XD3 | PK | | | | Ign. | | | | | | Rsvd | | | | | | Addr of 4 KB PF | | | | | | | Ign. | | | G | PAT | D | A | PCD | PWT | U/S | R/W | 1 |

FIG. 11

| | 63 | 62 | 61 | 60 | 59 | 58 | 57 | 56 | 55 | 54 | 53 | 52 | 51 | ... | M | M−1 | ... | 32 | 31 | 30 | ... | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|
| PTE (compatible with a conventional technology) | XD3 | PK | | | | Ign. | | | | | | | Rsvd | | | Addr of 4 KB PF | | | | | | | | Ign. | 0 | | G | PAT | D | A | PCD | PWT | U/S | R/W | 1 |

FIG. 12

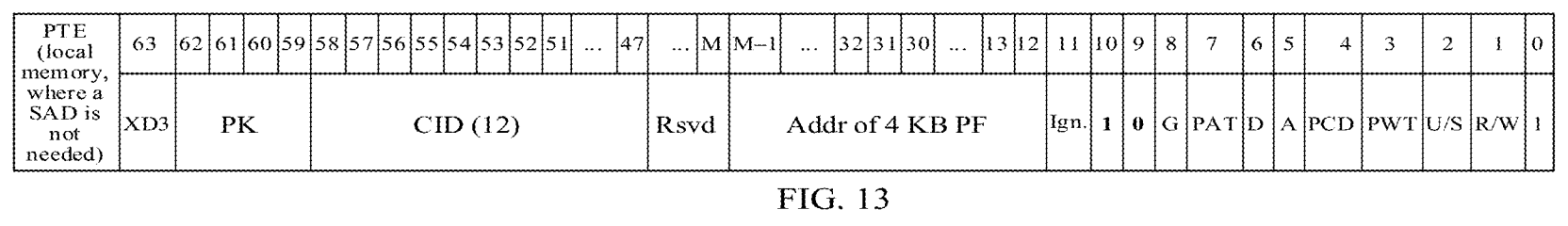

| PTE (local memory, where a SAD is not needed) | 63 | 62 | 61 | 60 | 59 | 58 | 57 | 56 | 55 | 54 | 53 | 52 | 51 | ... | 47 | ... | M | M-1 | ... | 32 | 31 | 30 | ... | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|
| | XD3 | PK | | | | CID (12) | | | | | | | | | | Rsvd | | | | | Addr of 4 KB PF | | | | | | Ign. | 1 | 0 | G | PAT | D | A | PCD | PWT | U/S | R/W | 1 |

FIG. 13

| | 63 | 62 | 61 | 60 | 59 | 58 | 57 | 56 | 55 | 54 | 53 | 52 | 51 | ... | M | M−1 | ... | 32 | 31 | 30 | ... | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|
| PTE (cross-node memory, where a SAD is not needed) | XD3 | PK | | | | | | Rsvd | | | | | | | Addr of 4 KB PF | | | | | | | | Ign. | | | 1 | G | PAT | D | A | PCD | PWT | U/S | R/W | 1 |
| | Ign. | | | | GID (24) | | | | | | | | | | | LID (16) | | | | | | | CID (12) | | | | | | | | | | | | | |

FIG. 14

METHOD AND APPARATUS, STORAGE MEDIUM, AND COMPUTER PROGRAM PRODUCT OF USING ROUTING INFORMATION IN PAGE TABLE ENTRY

CROSS-REFERENCE TO RELATED APPLICATIONS

This is a continuation of International Patent Application No. PCT/CN2022/137088, filed on Dec. 7, 2022, which claims priority to Chinese Patent Application No. 202210146330.6, filed on Feb. 17, 2022. The disclosures of the aforementioned applications are hereby incorporated by reference in their entireties.

TECHNICAL FIELD

Embodiments of this application relate to the field of computer technologies, and in particular, to a memory access method and apparatus, a storage medium, and a computer program product.

BACKGROUND

Currently, when performing memory access, most processors perform memory address locating by using a virtual address (VA). Space that is obtained through address locating and that is much larger than an actual physical address (PA) can be created by using the VA. In a process of performing memory address locating by using the VA, the processors need to convert the VA into the PA, and then perform memory access based on the PA.

In one approach, each processor in a computing node includes a core, a memory management unit (MMU), a system address decoder (SAD), a home agent (HA), and the like. In a process of performing memory access, the core obtains a memory access request initiated by an application program, and sends the memory access request to the NM, where the memory access request carries one VA. The MMU converts the VA into a PA of to-be-accessed memory data by querying a memory page table, and sends the PA to the SAD. The SAD determines, by querying the table, an HA to which the PA belongs, and routes the PA to the determined HA. In an example, the SAD decodes and routes the PA. The HA obtains the memory data based on the PA, and returns the obtained memory data to the core.

It can be learned that, in the one approach, the PA obtained by the MMU cannot be directly used to perform memory access, and the SAD is further needed for decoding the PA. Consequently, the process of performing memory access is complex.

SUMMARY

Embodiments of this application provide a memory access method and apparatus, a storage medium, and a computer program product, and a SAD may be not needed for decoding and routing a PA. This reduces complexity of memory access. The technical solution is as follows.

According to a first aspect, a memory access method is provided, and the method is applied to a computing system. The computing system includes a first computing node, the first computing node includes a first processor, and the first processor includes a first MMU and a first core. The method includes the following steps.

The first MMU receives a first memory access request sent by the first core, where the first memory access request carries a first virtual address VA; the first MMU queries a first memory page table based on the first VA, to obtain a first query result, where the first query result includes first routing information and a first PA; and the first MMU sends a second memory access request to a target module indicated by the first routing information, where the second memory access request carries the first PA, and the second memory access request indicates the target module to obtain memory data based on the first PA and return the memory data to the first core. The first PA is a PA of the memory data.

In an example, the routing information is added to the memory page table, so that the MMU queries, in a process of performing address translation on the VA, the memory page table to obtain the routing information. In an example, after querying the memory page table and obtaining the PA, the MMU may directly route the PA based on the routing information, and a SAD is not needed for further decoding the PA. This reduces complexity of memory access.

Optionally, this solution supports access to a local memory and cross-node access to a memory. When different memories are accessed, the first routing information included in the first query result is different. The following describes different cases.

A first case is a case of accessing the local memory. In an example, the target module is an HA in the first computing node. In an example, when the local memory is accessed, the first MMU completes address conversion on the first VA, and routes the first PA to an HA in the node based on the obtained first routing information, to obtain the memory data from memory space managed by the HA.

Optionally, the target module is a first HA of the first processor, and the first routing information includes an identifier of the first HA. In an example, in a case of not crossing processors, the first routing information does not need to include an identifier of the first processor.

Alternatively, the first computing node further includes a second processor, the target module is a second HA of the second processor, and the first routing information includes an identifier of the second processor and an identifier of the second HA. In an example, in a case of crossing processors, the first routing information needs to include the identifier of the second processor.

Optionally, that the first MMU queries a first memory page table based on the first VA, to obtain a first query result includes the first MMU that queries the first memory page table for a first page table entry (PTE) corresponding to the first VA; the first MMU obtains first indication information in the first PTE, where the first indication information indicates that a local memory is accessed, and the first PTE records the first routing information; the first MMU obtains a physical page frame number and the first routing information in the first PTE based on the first indication information; and the first MMU concatenates the physical page frame number and an address offset field in the first VA, to obtain the first PA. In an example, when querying a last-level page table in the first memory page table based on the first VA, the first MMU obtains the first routing information from a PTE of the last-level page table, and performs concatenation to obtain the PA (namely, the first PA) of the memory data.

A second case is a case of accessing the memory across nodes. In an example, the computing system further includes a second computing node, the second computing node includes a third processor, and the second computing node stores the memory data. The target module is a third HA of the third processor, and the first routing information includes an identifier of the second computing node, an identifier of the third processor, and an identifier of the third HA. In an example, when the memory is accessed across nodes, the first MMU completes address conversion on the first VA, and routes the first PA to an HA in a remote node based on the obtained first routing information, to obtain the memory data from memory space managed by the HA. Optionally, the second computing node includes first memory space. The first memory space includes a memory that is provided by the second computing node for the first computing node, and the first memory space stores the memory data. The third HA obtains the memory data from the first memory space. To some extent, it may be considered that, when accessing the first memory space, the first computing node cannot perceive that the access is cross-node access.

Optionally, that the first MMU queries a first memory page table based on the first VA, to obtain a first query result includes the first MMU that queries the first memory page table for a first PTE corresponding to the first VA; the first MMU obtains second indication information in the first PTE, where the second indication information indicates that a memory is accessed across nodes, and the first PTE records the first routing information; the first MMU obtains a physical page frame number and the first routing information in the first PTE based on the second indication information; and the first MMU concatenates the physical page frame number and an address offset field in the first VA, to obtain the first PA. In an example, when querying a last-level page table in the first memory page table based on the first VA, the first MMU obtains the first routing information from a PTE of the last-level page table, and performs concatenation to obtain the PA of the memory data.

It should be noted that, in the process of performing address translation, the first MMU needs to query the corresponding page table based on a PA of each level of page table. In this solution, the SAD is not needed for decoding and routing the PA of the memory data, and the SAD may further be not needed for decoding and routing the PA of the page table. Details are provided below.

Optionally, the first computing node further includes a fourth processor, the first memory page table includes a first-level page table, the first memory access request further carries a PA of the first-level page table and second routing information, the second routing information indicates a fourth HA of the fourth processor, and memory space managed by the fourth HA stores the first-level page table. That the first MMU queries a first memory page table based on the first VA includes the first MMU that routes the PA of the first-level page table to the fourth HA indicated by the second routing information, to query, by using the fourth HA, the first-level page table for an entry corresponding to the first VA. In an example, the PA of the first-level page table does not need to be decoded and routed via the SAD, and the first MMU can directly route the PA of the first-level page table based on an indication of the second routing information in a process of querying a first-level page table.

Optionally, the PA of the first-level page table is unique in the memory space managed by the fourth HA, and is not unique in memory space of the first computing node. In this way, in an implementation in which the first memory access request carries the second routing information, the first-level page table can be accurately located by using the second routing information. Certainly, the PA of the first-level page table may alternatively be unique in memory space of the first computing node.

Optionally, the first memory access request includes a control register (CR3) field, and the CR3 field carries the PA of the first-level page table and the second routing information. In an example, in this solution, the CR3 field is extended, so that the PA of the first-level page table is routed based on the indication of the second routing information.

Optionally, before the first MMU routes the PA of the first-level page table to the fourth HA indicated by the second routing information, the method further includes the first MMU that obtains fourth indication information in the CR3 field, where the fourth indication information indicates that the CR3 field carries the second routing information; and the first MMU obtains the second routing information in the CR3 field based on the fourth indication information. In an example, the fourth indication information in the CR3 field indicates that the SAD is not needed for performing decoding and routing.

Optionally, the first memory page table is a multi-level page table, and each page directory entry of each level of page table other than a last-level page table in the multi-level page table records routing information that indicates a storage location of a next-level page table. In this way, when finding each level of page table other than the last-level page table, the first MMU can obtain the routing information of the storage location of the next-level page table. The first MMU can route a PA of the next-level page table based on the obtained routing information, and the SAD is not needed for decoding and routing the PA of the next-level page table. In an example, in this solution, the page directory entry of each level of page table other than the last-level page table is extended, to record the routing information that indicates the storage location of the next-level page table.

Optionally, each page directory entry of each level of page table other than the last-level page table in the multi-level page table further records fifth indication information, and the fifth indication information indicates that a corresponding page directory entry records the routing information that indicates the storage location of the next-level page table.

According to a second aspect, a memory access apparatus is provided. The memory access apparatus has a function of implementing behavior of the memory access method according to the first aspect. The memory access apparatus includes one or more modules, and the one or more modules are configured to implement the memory access method according to the first aspect.

In an example, the memory access apparatus is provided. A computing system includes a first computing node, the first computing node includes a first processor, the first processor includes a first MMU and a first core, and the apparatus is used in the first MMU. The apparatus includes a receiving module, configured to receive a first memory access request sent by the first core, where the first memory access request carries a first VA; an address conversion module, configured to query a first memory page table based on the first VA, to obtain a first query result, where the first query result includes first routing information and a first PA; and a sending module, configured to send a second memory access request to a target module indicated by the first routing information, where the second memory access request carries the first PA, and the second memory access request indicates the target module to obtain memory data based on the first PA and return the memory data to the first core.

Optionally, the target module is an HA in the first computing node.

Optionally, the target module is a first HA of the first processor, and the first routing information includes an identifier of the first HA.

Optionally, the first computing node further includes a second processor, the target module is a second HA of the second processor, and the first routing information includes an identifier of the second processor and an identifier of the second HA.

Optionally, the address conversion module includes a first page table query submodule, configured to query the first memory page table for a first PTE corresponding to the first VA; a first obtaining submodule, configured to obtain first indication information in the first PTE, where the first indication information indicates that a local memory is accessed, and the first PTE records the first routing information; a second obtaining submodule, configured to obtain a physical page frame number and the first routing information in the first PTE based on the first indication information; and a first concatenating submodule, configured to concatenate the physical page frame number and an address offset field in the first VA, to obtain the first PA.

Optionally, the computing system further includes a second computing node, the second computing node includes a third processor, and the second computing node stores the memory data.

The target module is a third HA of the third processor, and the first routing information includes an identifier of the second computing node, an identifier of the third processor, and an identifier of the third HA.

Optionally, the second computing node includes first memory space. The first memory space includes a memory that is provided by the second computing node for the first computing node, and the first memory space stores the memory data.

Optionally, the address conversion module includes a second page table query submodule, configured to query the first memory page table for a first PTE corresponding to the first VA; a third obtaining submodule, configured to obtain second indication information in the first PTE, where the second indication information indicates that a memory is accessed across nodes, and the first PTE records the first routing information; a fourth obtaining submodule, configured to obtain a physical page frame number and the first routing information in the first PTE based on the second indication information; and a second concatenating submodule, configured to concatenate the physical page frame number and an address offset field in the first VA, to obtain the first PA.

Optionally, the first computing node further includes a fourth processor, the first memory page table includes a first-level page table, the first memory access request further carries a PA of the first-level page table and second routing information, the second routing information indicates a fourth HA of the fourth processor, and memory space managed by the fourth HA stores the first-level page table.

The address conversion module includes a first-level page table query submodule, configured to route the PA of the first-level page table to the fourth HA indicated by the second routing information, to query, by using the fourth HA, the first-level page table for an entry corresponding to the first VA.

Optionally, the PA of the first-level page table is unique in the memory space managed by the fourth HA, and is not unique in memory space of the first computing node.

Optionally, the first memory access request includes a CR3 field, and the CR3 field carries the PA of the first-level page table and the second routing information.

Optionally, the address conversion module further includes a fifth obtaining submodule, configured to obtain fourth indication information in the CR3 field, where the fourth indication information indicates that the CR3 field carries the second routing information; and a sixth obtaining submodule, configured to obtain the second routing information in the CR3 field based on the fourth indication information.

Optionally, the first memory page table is a multi-level page table, and each page directory entry of each level of page table other than a last-level page table in the multi-level page table records routing information that indicates a storage location of a next-level page table.

Optionally, each page directory entry of each level of page table other than the last-level page table in the multi-level page table further records fifth indication information, and the fifth indication information indicates that a corresponding page directory entry records the routing information that indicates the storage location of the next-level page table.

According to a third aspect, a computer device is provided. The computer device includes a processor and a storage. The storage is configured to store a program that is for performing the memory access method according to the first aspect, and store data that is related to implementing the memory access method according to the first aspect. The processor is configured to execute the program stored in the storage. An operation apparatus of the storage may further include a communication bus, and the communication bus is configured to establish a connection between the processor and the storage.

According to a fourth aspect, a computer-readable storage medium is provided. The computer-readable storage medium stores instructions. When the instructions are run on a computer, the computer is enabled to perform the memory access method according to the first aspect.

According to a fifth aspect, a computer program product including instructions is provided. When the instructions are run on a computer, the computer is enabled to perform the memory access method according to the first aspect.

Technical effects obtained in the second aspect, the third aspect, the fourth aspect, and the fifth aspect are similar to those technical effects obtained by using a corresponding technical means in the first aspect. Details are not described herein again.

The technical solution provided in embodiments of this application can bring at least the following beneficial effects.

Routing information is added to a memory page table, so that an MMU queries, in a process of performing address translation on a VA, the memory page table to obtain the routing information. In this way, after querying the memory page table and obtaining a PA, the MMU may directly route the PA based on the routing information, and a SAD is not needed for further decoding the PA. In an example, in this solution, a set of memory page tables having the routing information is designed. This reduces complexity of memory access.

BRIEF DESCRIPTION OF DRAWINGS

FIG. 3 is a schematic diagram of a structure of a computer device according to an embodiment of this application;

FIG. 4 is a schematic flowchart of a memory access method according to an embodiment of this application;

FIG. 5 is a schematic diagram of a structure of a CR3 field according to an embodiment of this application;

FIG. 6 is a schematic diagram of a structure of another CR3 field according to an embodiment of this application;

FIG. 7 is a schematic diagram of a structure of still another CR3 field according to an embodiment of this application;

FIG. 8 is a schematic diagram of a structure of a PDPTE/PDE according to an embodiment of this application;

FIG. 9 is a schematic diagram of a structure of another PDPTE/PDE according to an embodiment of this application;

FIG. 10 is a schematic diagram of a structure of still another PDPTE/PDE according to an embodiment of this application;

FIG. 11 is a schematic diagram of a structure of a PTE according to an embodiment of this application;

FIG. 12 is a schematic diagram of a structure of another PTE according to an embodiment of this application;

FIG. 13 is a schematic diagram of a structure of still another PTE according to an embodiment of this application;

FIG. 14 is a schematic diagram of a structure of yet another PTE according to an embodiment of this application;

DESCRIPTION OF EMBODIMENTS

To make the objectives, technical solution, and advantages of embodiments of this application clearer, the following further describes implementations of this application in detail with reference to the accompanying drawings.

A network architecture and a service scenario described in embodiments of this application are intended to describe the technical solution in embodiments of this application more clearly, and do not constitute a limitation on the technical solution provided in embodiments of this application. A person of ordinary skill in the art may know that, with evolution of the network architecture and emergence of new service scenarios, the technical solution provided in embodiments of this application is also applicable to similar technical problems.

Figure 1:
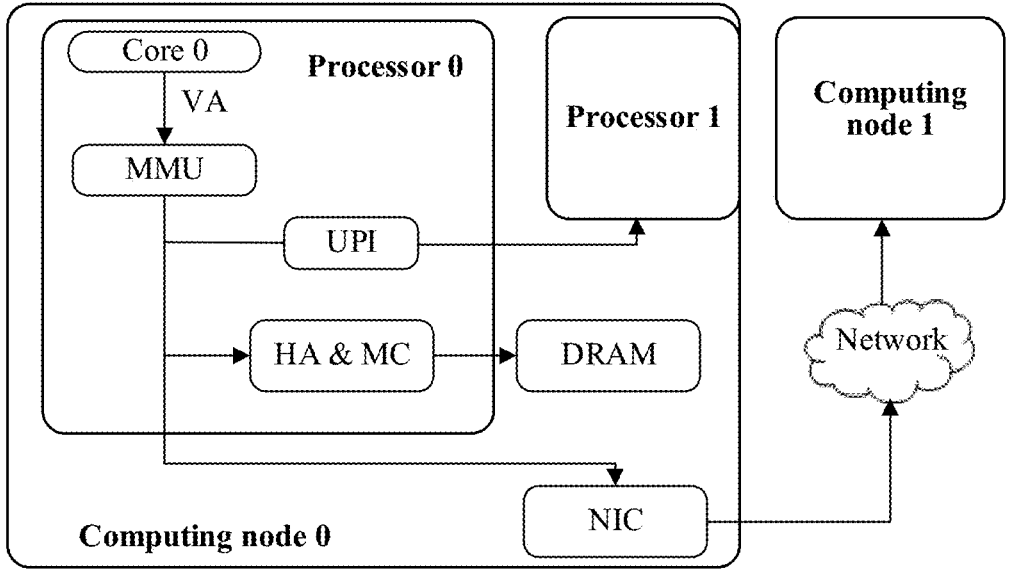
FIG. 1 is a diagram of a system architecture related to a memory access method according to an embodiment of this application.

FIG. 1 is a diagram of a system architecture related to a memory access method according to an embodiment of this application. The system architecture includes one or more computing nodes, and a system may be referred to as a computing system, a computing center, a data center, or the like. Referring to FIG. 1, an example in which the system architecture includes a plurality of computing nodes is used. Each computing node includes at least one processor, and each processor includes at least one core, MMU, and the like. In this embodiment of this application, each processor further includes an HA. Optionally, one processor has one HA, or one HA is used by each processor in a same computing node.

The core is configured to obtain a memory access request initiated by an application program, and send the memory access request to the MMU, where the memory access request carries one VA. The MMU is configured to receive the memory access request sent by the core, and query a memory page table based on the VA, to obtain a query result, where the query result includes one piece of routing information and a PA of to-be-accessed memory data.

Optionally, this solution supports access to a local memory and cross-node access to a memory. When different memories are accessed, first routing information included in a first query result is different. The following briefly describes two cases.

A first case is a case of accessing the local memory. In an example, a target module indicated by the routing information is an HA in the computing node. The HA is configured to directly obtain, based on the PA of the memory data, the memory data from the local memory.

A second case is a case of accessing the memory across nodes. In an example, the computing node may access a memory of another computing node. A target module indicated by the routing information is an HA of a processor in the another computing node. The HA is configured to directly obtain, based on the PA of the memory data, the memory data from memory space managed by the HA.

In this embodiment of this application, the processor further includes a memory controller (MC). The HA in this specification accesses a memory via the MC. Details are not described below. The memory is, for example, a dynamic random-access memory (DRAM), or the like. In addition, the computing node further includes a network interface card (NIC). Communication between computing nodes in this specification may be implemented via the network interface card.

Figure 2:
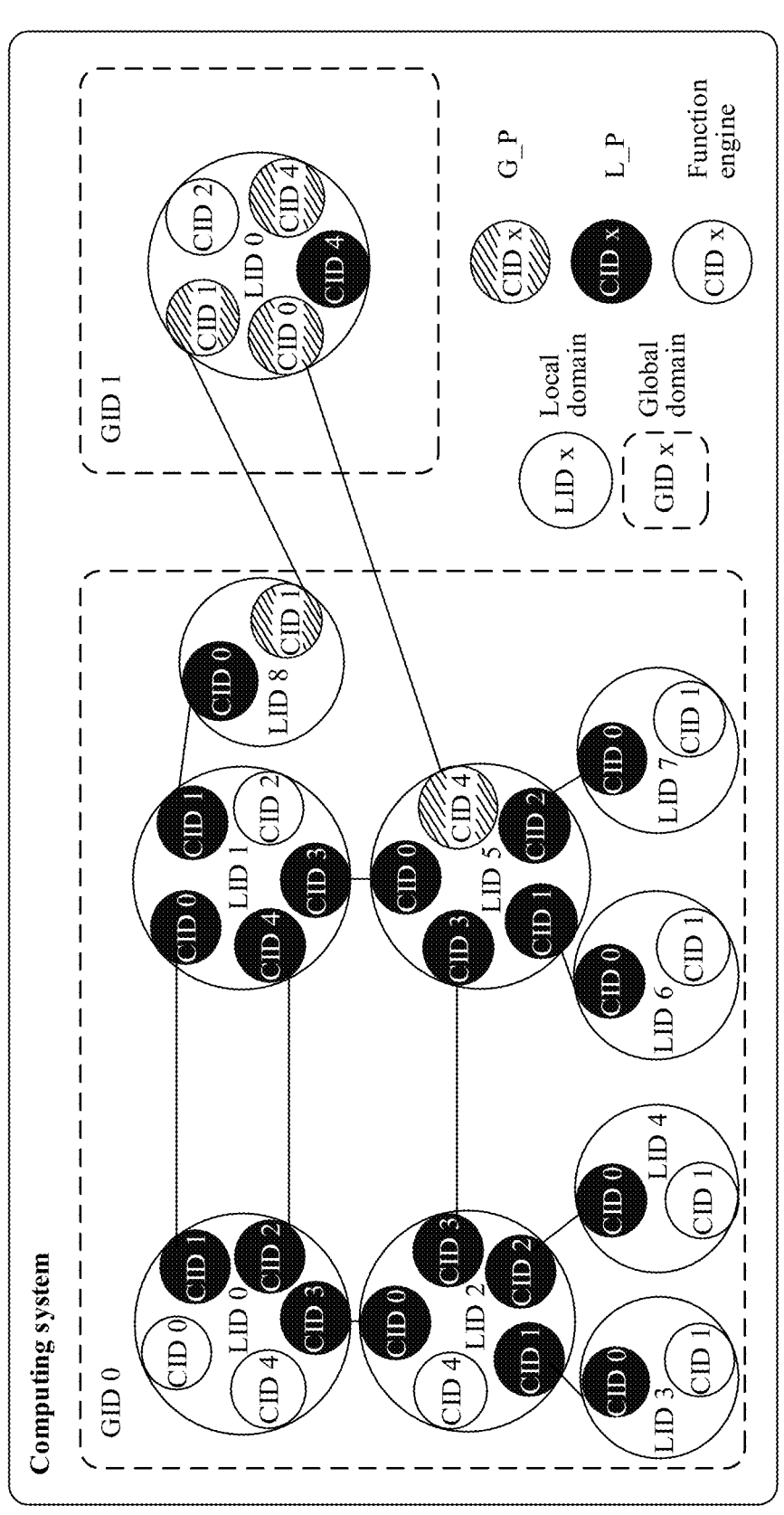
FIG. 2 is a schematic diagram of an architecture of a computing system according to an embodiment of this application.

FIG. 2 is a schematic diagram of an architecture of a computing system according to an embodiment of this application. Referring to FIG. 2, to unify an interconnection manner and improve efficiency of routing and address locating, the computing system is divided into a global domain, a local domain, and a component domain by using a hierarchical idea, and different types of ports are designed to connect domains of different layers. One global domain includes one computing node, one local domain includes a logic module in a same computing node, and one component domain includes a function engine (Egn) and a port in a same logic module. Different computing nodes are identified by using different global identifiers (GIDs), different logic modules in the same computing node are identified by using different local identifiers (LIDs), and different function engines and ports in the same logic module are identified by using different component identifiers (CIDs). In an example, a same addressing rule is used for routing and address locating manners of the computing node, the logic module, and a functional module. In an example, a unified communication protocol is used, and complex protocol conversion is not needed in an interaction process. The logic module is, for example, a processor, a peripheral of the processor, and the peripheral is, for example, a Peripheral Component Interconnect Express (PCIe) device, a network interface card (NIC), or the like. The function engine is, for example, a core, an NM, an SMMU, an HA, an MC, or the like in the processor, or a functional module having a processing capability in the PCIe device. The port is classified into a global port (G_P) and a local port (L_P). The global port is configured to connect different global domains, and the local port is configured to connect different local domains in a same global domain. The global port is, for example, a port in the network interface card, and the local port is, for example, an ultra path interconnect (UPI) interface in the processor. In this embodiment of this application, a manner in which routing is performed by using the GID, the LID, and the CID is referred to as a unified component interconnect (UCI) routing manner.

Based on this, FIG. 1 and FIG. 2 may be used in combination, to improve memory access efficiency. In an example, in embodiments of this application, the routing information may be represented by using the global identifier (GID), the local identifier (LID), and the component identifier (CID). The GID, LID, and CID are used to perform unified routing and addressing. This breaks complex protocol conversion in interaction processes between components in the processor, between processors, and between computing nodes, and improves efficiency of address locating in the interaction process.

Certainly, an identifier used for representing the routing information may alternatively be an identifier in another form. For example, the computing node is identified by using an Internet Protocol (IP) address, the processor is identified by using a node ID, a component in the processor is identified by using a mesh ID, and a corresponding ID of a component in the peripheral is formed by using bus-device-function (BDF), so that compatibility with a one approach can be performed.

FIG. 3 is a schematic diagram of a structure of a computer device according to an embodiment of this application. Optionally, the computer device is any computing node shown in FIG. 1 or FIG. 2, and the computer device includes one or more processors 301, a communication bus 302, a storage 303, and one or more communication interfaces 304.

The processor 301 is a general-purpose central processing unit (CPU), a network processor (NP), a microprocessor, or one or more integrated circuits configured to implement the solution of this application, for example, an application-specific integrated circuit (ASIC), a programmable logic device (PLD), or a combination thereof. Optionally, the PLD is a complex programmable logic device (CPLD), a field-programmable gate array (FPGA), a generic array logic (GAL), or any combination thereof.

The communication bus 302 is configured to communicate information between the foregoing components. Optionally, the communication bus 302 is classified into an address bus, a data bus, a control bus, and the like. For ease of representation, only one thick line is used for representing the communication bus 302 in FIG. 3, but this does not mean that there is only one bus or only one type of bus.

Optionally, the storage 303 is a read-only memory (ROM), a random-access memory (RAM), an electrically erasable programmable ROM (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, this is not limited thereto. The storage 303 exists independently, and is connected to the processor 301 through the communication bus 302, or the storage 303 is integrated with the processor 301.

The communication interface 304 is configured to communicate with another device or a communication network via any transceiver-type apparatus. The communication interface 304 includes a wired communication interface, or may optionally include a wireless communication interface. The wired communication interface is, for example, an Ethernet interface, or the like. Optionally, the Ethernet interface is an optical interface, an electrical interface, or a combination thereof. The wireless communication interface is a wireless local area network (WLAN) interface, a cellular network communication interface, a combination thereof, or the like.

Optionally, in some embodiments, the computer device includes a plurality of processors, for example, the processor 301 and a processor 305 shown in FIG. 3. Each of the processors is a single-core processor or a multi-core processor. Optionally, the processors herein refer to one or more devices, circuits, and/or processing cores configured to process data (for example, computer program instructions).

During an example implementation, in an embodiment, the computer device further includes an output device 306 and an input device 307. The output device 306 communicates with the processor 301, and can display information in a plurality of manners. For example, the output device 306 is a liquid-crystal display (LCD), a light-emitting diode (LED) display device, a cathode-ray tube (CRT) display device, a projector, or the like. The input device 307 communicates with the processor 301, and can receive a user input in a plurality of manners. For example, the input device 307 is a mouse, a keyboard, a touchscreen device, a sensing device, or the like.

In some embodiments, the storage 303 is configured to store program code 310 that is for performing the solution of this application, and the processor 301 can execute the program code 310 stored in the storage 303. The program code includes one or more software modules, and the computer device can implement, via the processor 301 and the program code 310 in the storage 303, a memory access method provided in the following embodiment in FIG. 4.

FIG. 4 is a schematic flowchart of a memory access method according to an embodiment of this application. The method is applied to a computing system. Referring to FIG. 4, the method includes the following steps.

Step 401: A first MMU receives a first memory access request sent by a first core, where the first memory access request carries a first VA.

In this embodiment of this application, the computing system includes a first computing node, the first computing node includes a first processor, and the first processor includes the first MMU and the first core. The first core obtains the memory access request initiated by an application program, where the memory access request carries the first VA. The first core corresponds to a translation lookaside buffer (TLB), and the first core first queries, via the TLB, for a first PTE corresponding to the first VA. If the first PTE corresponding to the VA is not buffered in the TLB, it indicates a TLB miss. In an example, the first core sends the first memory access request to the first MMU, where the first memory access request carries the first VA. The first MMU receives the first memory access request. It should be noted that, the first VA is a VA generated when the application program initiates the memory access request. In addition, a memory access process in this solution includes address conversion (namely, address translation) and memory data obtaining. The first MMU is configured to perform address conversion, and the first memory access request is essentially to request the first MMU to perform address conversion. In some embodiments, the first memory access request may also be referred to as an address conversion request.

Optionally, the first core includes an address generation unit (AGU). After obtaining the first VA via the AGU, the first core queries the corresponding TLB for the first PTE corresponding to the first VA.

Step 402: The first MMU queries a first memory page table based on the first VA, to obtain a first query result, where the first query result includes first routing information and a first PA.

It can be learned from the foregoing descriptions that, in embodiments of this application, a memory page table records routing information. In an example, the first query result that is obtained by the first MMU by querying the first memory page table based on the first VA includes the first PA and further includes the first routing information. The first PA is a PA of to-be-accessed memory data, the first routing information indicates a target module, and the target module is a module to which the first MMU is to route the first PA. In this way, a SAD is not needed.

The following describes a detailed process in which the first MMU queries the first memory page table based on the first VA.

In this embodiment of this application, the first memory page table is a one-level page table or a multi-level page table. When the first memory page table is the multi-level page table, the multi-level page table includes a first-level page table, a second-level page table, and the like. The first VA includes a plurality of index fields and one address offset field, where the plurality of index fields include a first index field, a second index field, and the like. In addition to the first VA, the first memory access request further carries a PA of the first-level page table. The first MMU queries the first-level page table based on the PA of the first-level page table, to obtain, from the first-level page table, a page directory entry corresponding to the first index field in the first VA. The first MMU obtains a PA recorded in the page directory entry. The PA is a PA of a next-level page table. The first MMU queries the next-level page table (namely, the second-level page table) based on the PA of the next-level page table, to obtain, from the second-level page table, a page directory entry corresponding to the second index in the first VA. The first MMU obtains a PA recorded in the page directory entry. By analogy, the first MMU queries a last-level page table, to obtain, from the last-level page table, a page table entry corresponding to a last-level index field in the first VA, where the page table entry is the first PTE corresponding to the first VA. The first MMU determines the first query result based on the first PTE.

Differences between the one-level page table and the multi-level page table lie in that the one-level page table includes a first-level page table, the first VA includes a first index field and an address offset field, and the first MMU obtains, from the first-level page table, a page table entry corresponding to the first index field in the first VA, where the page table entry is the first PTE corresponding to the first VA.

It can be learned from the foregoing two paragraphs of descriptions that, in a process of performing address translation, the first MMU needs to query a corresponding page table based on a PA of each level of page table. In one approach, after a first MMU obtains a PA of any page table, a SAD decodes and routes the PA of the page table. However, in this solution, the SAD is not needed for decoding and routing the PA of the memory data, and the SAD is not needed for decoding and routing the PA of the page table. Details are provided below.

Optionally, the first computing node further includes a fourth processor, the first memory page table includes a first-level page table, the first memory access request further carries a PA of the first-level page table and second routing information, the second routing information indicates a fourth HA of the fourth processor, and memory space managed by the fourth HA stores the first-level page table. A process in which the first MMU queries the first memory page table based on the first VA includes the first MMU that routes the PA of the first-level page table to the fourth HA indicated by the second routing information, to query, by using the fourth HA, the first-level page table for an entry corresponding to the first VA. In an example, the PA of the first-level page table does not need to be decoded and routed via the SAD, and the first MMU can directly route the PA of the first-level page table based on an indication of the second routing information in a process of querying a first-level page table.

It should be noted that the fourth processor is the same as or different from the first processor. When the fourth processor is the first processor, the fourth HA is an HA of the first processor. In an example, the first-level page table is stored in memory space managed by a first HA of the first processor, or is stored in memory space managed by an HA of another processor in the first computing node. Optionally, when the fourth processor is different from the first processor, the second routing information includes an identifier of the fourth processor and an identifier of the fourth HA. When the fourth processor is the same as the first processor, the second routing information includes an identifier of the fourth HA, or further includes an identifier of the fourth processor. In addition, when the first memory access request does not carry the second routing information, the PA of the first-level page table is decoded and routed via the SAD. In an example, compatibility with the one approach is performed.

Optionally, the PA of the first-level page table is unique in the memory space managed by the fourth HA, and is allowed to be not unique in memory space of the first computing node. In this way, in an implementation in which the first memory access request carries the second routing information, the first-level page table can be accurately located by using the second routing information. Certainly, the PA of the first-level page table may alternatively be unique in memory space of the first computing node.

Optionally, the first memory access request includes a CR3 field, and the CR3 field carries the PA of the first-level page table and the second routing information. In an example, in this solution, the CR3 field is extended, so that the PA of the first-level page table is routed based on the indication of the second routing information. It should be noted that the CR3 field is also a field generated when the application program initiates the memory access request.

Optionally, before routing the PA of the first-level page table to the fourth HA indicated by the second routing information, the first MMU obtains fourth indication information in the CR3 field, where the fourth indication information indicates that the CR3 field carries the second routing information. The first MMU obtains the second routing information in the CR3 field based on the fourth indication information. In an example, the fourth indication information in the CR3 field indicates that the SAD is not needed for performing decoding and routing.

Optionally, the CR3 field includes a first routing indication bit, and the first routing indication bit carries the fourth indication information. For example, a value of the first routing indication bit is 1. This indicates that the CR3 field carries the second routing information, and the SAD is not needed for performing decoding and routing. A value of the first routing indication bit is 0. This indicates that the CR3 field does not carry the second routing information, and the SAD is needed for performing decoding and routing. In an example, compatibility with the one approach is performed. It should be noted that, in an implementation in which the compatibility with the one approach is not needed, the CR3 field does not need the first routing indication bit. This indicates that the CR3 field records the second routing information by default.

FIG. 5 is a schematic diagram of a structure of a CR3 field according to an embodiment of this application. The CR3 field is one type of CR3 field in the one approach, and has 64 bits in total. This specification briefly describes the 64 bits of the CR3 field.

Bits 0 to 2 are ignored (Ign.).

Bits 3 and 4 are used flag bits.

Bits 5 to 11 are ignored (Ign.).

Bits 12 to M−1 are a PA of a first-level page table, for example, a base_address of a page map level-4 or level-5 page table (address of PML4 or PML5 table, Addr of PML4 or PML5 Tbl). An English full name of PML is page map level, and PML means page map level in Chinese.

Bits M to 63 are reserved (Rsvd) bits, and are not used.

FIG. 6 is a schematic diagram of a structure of another CR3 field according to an embodiment of this application. The CR3 field is an extended CR3 field in this solution. A difference between FIG. 6 and FIG. 5 is as follows.

Bit 0 is a first routing indication bit. Bit 0=0 indicates a SAD routing manner, compatible with the one approach. In an example, the CR3 field does not record second routing information.

FIG. 7 is a schematic diagram of a structure of still another CR3 field according to an embodiment of this application. The CR3 field is an extended CR3 field in this solution. Differences between FIG. 7 and FIG. 6 are as follows.

Bit 0 is a first routing indication bit. Bit 0=1 indicates a UCI routing manner. In an example, the CR3 field records second routing information.

Bits 36 to 63 are second indication information. Bits 36 to 47 carry an identifier of an HA, for example, a CID of the fourth HA, where the CID occupies 12 bits. Bits 48 to 63 carry an identifier of a processor, for example, a LID of the fourth processor, where the LID occupies 16 bits.

It should be noted that, in each of FIG. 6 and FIG. 7, an example in which the bit 0 of the CR3 is the first routing indication bit is used for description. In another embodiment, any bit that is not used in a CR3 may alternatively be used as a first routing indication bit, for example, bit 1, bit 2, or bit 5. In addition, due to a design in FIG. 7, a quantity of bits occupied by the PA of the first-level page table is restricted to some extent. When one CID occupies 12 bits, and one LID occupies 16 bits, and the quantity of bits of the PA of the first-level page table exceeds 36 bits, for example, reaches a maximum value 52 bits, the PA of the first-level page table needs to meet a 64 KB aligned standard. However, a quantity of bits of a PA in the CR3 field shown in FIG. 7 is small, and the quantity of bits of the PA may only meet a 4 KB aligned standard. In an example, a larger quantity of bits of the PA indicates a higher aligned standard.

It is assumed that the first memory page table is the multi-level page table, and optionally, each page directory entry of each level of page table other than the last-level page table in the multi-level page table records routing information that indicates a storage location of the next-level page table. In this way, when finding each level of page table other than the last-level page table, the first MMU can obtain the routing information of the storage location of the next-level page table. The first MMU can route the PA of the next-level page table based on the obtained routing information, and the SAD is not needed for decoding and routing the PA of the next-level page table. In an example, in this solution, the page directory entry of each level of page table other than the last-level page table is extended, to record the routing information that indicates the storage location of the next-level page table. The page directory entry of each level of page table other than the last-level page table is, for example, a page directory PTE (PDPTE), a page directory entry (PDE), or the like.

It should be noted that, when a page table at a level and a next-level page table thereof are stored in memory space managed by HAs of different processors, routing information that indicates a storage location of the next-level page table includes an identifier (for example, a LID) of one processor and an identifier (for example, a CID) of one HA. When a page table at a level and a next-level page table thereof are stored in memory space managed by an HA of a same processor, it indicates that the page tables at two adjacent levels do not cross HAs, or do not cross processors. In an example, routing information that indicates a storage location of the next-level page table may be omitted, or the routing information includes an identifier of the HA and/or an identifier of the processor.

Optionally, each page directory entry of each level of page table other than the last-level page table in the multi-level page table further records fifth indication information, and the fifth indication information indicates that a corresponding page directory entry records the routing information that indicates the storage location of the next-level page table. A function of the fifth indication information is similar to a function of the fourth indication information in the CR3 field. Details are not described herein again.

Optionally, each page directory entry of each level of page table other than the last-level page table in the multi-level page table includes a second routing indication bit, and the second routing indication bit carries the fifth indication information. For example, that a value of the second routing indication bit is 1 indicates that the corresponding page directory entry records the routing information that indicates the storage location of the next-level page table. In an example, the SAD is not needed for performing decoding and routing. That a value of the second routing indication bit is 0 indicates that the corresponding page directory entry does not record the routing information that indicates the storage location of the next-level page table. In an example, the SAD is needed for performing decoding and routing, and compatibility with the one approach is performed. It should be noted that, in an implementation in which the compatibility with the one approach is not needed, each page directory entry of each level of page table other than the last-level page table in the multi-level page table does not need the second routing indication bit. This indicates that the corresponding page directory entry records, by default, the routing information that indicates the storage location of the next-level page table.

FIG. 8 is a schematic diagram of a structure of a PDPTE/PDE according to an embodiment of this application. FIG. 8 shows the PDPTE/PDE in the one approach, and either of the PDPTE/PDE is 64 bits. This specification briefly describes the 64 bits of the PDPTE/PDE.

Bits 0 to 7 are used flag bits.

Bits 8 to 11 are ignored (Ign.).

Bits 12 to M−1 are a PA of a next-level page table, and are also referred to as a page frame address (address of 4 KB page frame, Addr of 4 KB PF), a page table start address, a page table base_address, or the like.

Bits M to 51 are reserved (Rsvd) bits, and are not used.

Bits 52 to 58 are ignored (Ign.).

Bits 59 to 62 are a protection word, and are also referred to as a protection key (protection key, PK), a protection key, or the like.

Bit 63 is a used flag bit.

FIG. 9 is a schematic diagram of a structure of another PDPTE/PDE according to an embodiment of this application. The PDPTE/PDE is an extended PDPTE/PDE in this solution. A difference between FIG. 9 and FIG. 8 is as follows.

Bit 8 is a second routing indication bit. Bit 8=0 indicates a SAD routing manner, compatible with the one approach. In an example, the PDPTE/PDE does not record routing information that indicates a storage location of a next-level page table.

FIG. 10 is a schematic diagram of a structure of still another PDPTE/PDE according to an embodiment of this application. The PDPTE/PDE is an extended PDPTE/PDE in this solution. Differences between FIG. 10 and FIG. 9 are as follows.

Bit 8 is a second routing indication bit. Bit 8=1 indicates a UCI routing manner. In an example, a corresponding page directory entry records routing information that indicates a storage location of a next-level page table.

Bits 47 to 58 are the routing information that indicates the storage location of the next-level page table. For example, the routing information includes an identifier of an HA, for example, a CID, where the CID occupies 12 bits. If the routing information further includes an identifier of a processor, for example, a LID, where the LID occupies 16 bits, 64 bits may be insufficient in an example. When the 64 bits are insufficient, for example, the routing information, a PA of the next-level page table, and the like that need to be carried exceed 64 bits, the PDPTE/PDT needs to be extended to 128 bits.

Based on the foregoing descriptions, in a process of querying the memory page table, the first MMU extends the memory page table to carry the routing information. In this way, the SAD is not needed for decoding and routing the PA of each level of page table. The second routing indication bits in the CR3 field, PDPTE, PDE, and the like indicate the SAD routing manner or the UCI routing manner, so that compatibility with the one approach can be performed.

When the first MMU queries the last-level page table based on the foregoing process, the first MMU obtains, from the last-level page table, the first PTE corresponding to the first VA, and determines the first query result based on the first PTE, where the first query result includes the first routing information and the first PA. The first routing information indicates the target module to which the first MMU routes the first PA. It can be learned from the foregoing descriptions that, this solution, access to a local memory and cross-node access to a memory are supported. Based on this, there are two cases of the first routing information included in the first query result. The following describes the two cases in detail.

A first case is a case of accessing the local memory. In an example, the target module indicated by the first routing information is an HA in the first computing node.

Optionally, the target module is the first HA of the first processor, and the first routing information includes an identifier of the first HA. In an example, because one processor generally includes one HA, in a case of not crossing HAs (in an example, not crossing processors), the first routing information does not need to include an identifier of the first processor. Certainly, the first routing information may alternatively include an identifier of the first processor.

Alternatively, the first computing node further includes a second processor, the target module is a second HA of the second processor, and the first routing information includes an identifier of the second processor and an identifier of the second HA. In an example, in a case of crossing HAs (in an example, crossing processors), the first routing information needs to include the identifier of the second processor.

Optionally, an implementation in which the first MMU queries the first memory page table based on the first VA, to obtain the first query result is as follows. The first MMU queries the first memory page table for the first PTE corresponding to the first VA, to obtain first indication information in the first PTE, where the first indication information indicates that the local memory is accessed, and the first PTE records the first routing information. The first MMU obtains a physical page frame number and the first routing information in the first PTE based on the first indication information, and concatenates the physical page frame number and the address offset field in the first VA, to obtain the first PA. In an example, when querying the last-level page table in the first memory page table based on the first VA, the first MMU obtains the first routing information from a PTE of the last-level page table, and performs concatenation to obtain the first PA. The physical page frame number (PFN) may also be a page base_address (PBA). When the local memory is accessed, the PA of the memory data is obtained by concatenating the page base_address and the offset.

Optionally, the first PTE includes a first indication bit and a second indication bit, and the first indication bit and the second indication bit may carry the first indication information. That a value of the first indication bit is 0 indicates that the local memory is accessed. That a value of the second indication bit is 1 indicates that the first PTE records the first routing information. After finding the first PTE, the first MMU obtains the first indication bit and the second indication bit in the first PTE. If the value of the first indication bit is 0, the first MMU obtains the physical page frame number in the first PTE, and concatenates the physical page frame number and the address offset field in the first VA, to obtain the first PA. If the value of the second indication bit is 1, the first MMU obtains the first routing information in the first PTE.

In an example, in a process in which the first MMU sequentially parses a plurality of bits of the first PTE, after the first indication bit is obtained through parsing, if the value of the first indication bit is 0, it indicates that the local memory is accessed. In an example, the first MMU continues to perform parsing to obtain the physical page frame number in the first PTE, to concatenate the physical page frame number and the address offset field in the first VA. After the second indication bit is obtained through parsing, if the value of the second indication bit is 1, it indicates that the first PTE records the first routing information. In an example, the first MMU continues to perform parsing to obtain the first routing information in the first PTE.

Alternatively, that a value of the first indication bit in the first PTE is 1 indicates that the memory is accessed across nodes. If a value of the second indication bit is 0, it indicates that the first PTE does not record the first routing information. In an example, the PA of the memory data still needs to be decoded and routed via the SAD. In an example, compatibility with the one approach is performed. It should be noted that, in an implementation in which the compatibility with the one approach is not needed, the first PTE does not need the second indication bit. This indicates that the first PTE records the first routing information by default.

FIG. 11 is a schematic diagram of a structure of a PTE according to an embodiment of this application. The PTE is one type of PTE in the one approach, and has 64 bits in total. This specification briefly describes the 64 bits of the PTE.

Bits 0 to 8 are used flag bits.

Bits 9 and 11 are ignored (Ign.).

Bits 12 to M−1 are a physical page frame number (PFN), and are also referred to as a page frame address (address of 4 KB page frame, Addr of 4 KB PF), a start address or a base_address of a page table, or the like.

Bits M to 51 are reserved (Rsvd) bits, and are not used.

Bits 52 to 58 are ignored (Ign.).

Bits 59 to 62 are a protection key (PK).

Bit 63 is a used flag bit.

FIG. 12 is a schematic diagram of a structure of another PTE according to an embodiment of this application. The PTE is an extended PTE in this solution. Differences between FIG. 12 and FIG. 11 are as follows.

Bit 9 is a first indication bit. Bit 9=0 indicates that a local memory is accessed.

Bit 10 is a second indication bit. Bit 10=0 indicates a SAD routing manner, compatible with the one approach. In an example, the PTE does not record first routing information.

FIG. 13 is a schematic diagram of a structure of still another PTE according to an embodiment of this application. The PTE is an extended PTE in this solution. Differences between FIG. 13 and FIG. 12 are as follows.

Bit 9 is a first indication bit. Bit 9=0 indicates that a local memory is accessed.

Bit 10 is a second indication bit. Bit 10=1 indicates a unified component interconnect (UCI) routing manner. In an example, the PTE records first routing information.

Bits 47 to 58 are the first routing information. The first routing information includes an identifier of an HA, for example, a CID of a first HA. It should be noted that in this specification an example in which one CID occupies 12 bits is used for description. The 12 bits are not intended to limit this embodiment of this application. In another embodiment, one CID may alternatively occupy 8 bits, 14 bits, or the like. In addition, when the first routing information further includes the identifier of the processor, for example, includes a local identifier (LID) of the first processor or the second processor, if the 64-bit PTE is insufficient, a quantity of bits of the PTE needs to be extended. For example, the PTE is extended to 128 bits.

It should be further noted that, in each of FIG. 12 and FIG. 13, an example in which the bit 9 of the PTE is the first indication bit and the bit 10 is the second indication bit is used for description. In another embodiment, any other two bits that are not used in a PTE may alternatively be used as a first indication bit and a second indication bit, for example, bit 9 and bit 11, or bit 10 and bit 11. In addition, due to a design in FIG. 13, a quantity of bits of a page frame address is restricted to some extent. When one CID occupies 12 bits, the PTE carries the CID but does not carry the LID, and the quantity of bits of the page frame address (namely, one PA) exceeds 36 bits, for example, reaches a maximum value 52 bits, the page frame address needs to meet a 64 KB aligned standard.

A second case is a case of accessing the memory across nodes. The computing system further includes a second computing node, and the second computing node includes a third processor. When the memory is accessed across nodes, the target module is a third HA of the third processor, and the first routing information includes an identifier of the second computing node, an identifier of the third processor, and an identifier of the third HA.

Optionally, the second computing node includes first memory space. The first memory space includes a memory that is provided by the second computing node for the first computing node, and the first memory space stores the memory data. In an example, the first computing node can access the first memory space.

Optionally, an implementation in which the first MMU queries the first memory page table based on the first VA, to obtain the first query result is as follows. The first MMU queries the first memory page table for the first PTE corresponding to the first VA, to obtain second indication information in the first PTE, where the second indication information indicates that the memory is accessed across nodes, and the first PTE records the first routing information. The first MMU obtains a physical page frame number and the first routing information in the first PTE based on the second indication information, and concatenates the physical page frame number and the address offset field in the first VA, to obtain the first PA. In an example, when querying the last-level page table in the first memory page table based on the first VA, the first MMU obtains the first routing information from a PTE of the last-level page table, and performs concatenation to obtain the first PA. The first PA is obtained by concatenating the PFN and the offset.

It can be learned from the foregoing descriptions that, in an implementation, the first PTE includes a first indication bit and a second indication bit, and the first indication bit may carry the second indication information. That a value of the first indication bit is 1 indicates that the memory is accessed across nodes, and the first PTE records the first routing information. After finding the first PTE, the first MMU obtains the first indication bit in the first PTE. If the first indication bit is 1, the first MMU obtains the first routing information and the physical page frame number in the first PTE, and concatenates the physical page frame number and the address offset field in the first VA, to obtain the first PA.

In an example, in a process in which the first MMU sequentially parses a plurality of bits of the first PTE, after the first indication bit is obtained through parsing, if the value of the first indication bit is 1, it indicates that the memory is accessed across nodes, and the first PTE records the first routing information. In an example, the first MMU continues to perform parsing to obtain the first routing information and the physical page frame number in the first PTE, to concatenate the physical page frame number and the address offset field in the first VA.

It should be noted that, when the memory is accessed across nodes, the first PTE records the first routing information. In an example, when the memory is accessed across nodes, routing needs to be performed by using the first routing information, and the SAD is not needed.

It can be learned from the foregoing descriptions that, in this solution, the PTE is extended to carry the first routing information. When the memory is accessed across nodes, the first routing information occupies a large quantity of bits, the 64-bit PTE may be insufficient. For example, the first routing information includes GID+LID+CID. Therefore, the PTE needs to be extended to 128 bits.

FIG. 14 is a schematic diagram of a structure of yet another PTE according to an embodiment of this application. The PTE shown in FIG. 14 is an extended PTE that includes 128 bits in this solution. Differences between FIG. 14 and FIG. 13 are as follows. A total quantity of bits in FIG. 14 is different from a total quantity of bits in FIG. 13. In addition, in the PTE shown in FIG. 14, bit 9=1, a value of bit 10 is not limited, and GID+LID+CID is recorded. The GID occupies 24 bits, the LID occupies 16 bits, and the CID occupies 12 bits. It should be noted that locations of the GID, the LID, and the CID in the PTE in FIG. 14 are merely examples, and are not intended to limit this embodiment of this application.

It can be learned from the foregoing descriptions that, in this solution, both the access to the local memory and the cross-node access to the memory are supported. For ease of address conversion in different access cases, two sets of memory page tables are designed in this solution. For example, the first memory page table used for address conversion includes two sets of memory page tables. A first set of memory page tables is used for address conversion in a process of accessing the local memory, and a last-level page table in the first set of memory page tables may be referred to as a page table (PT). A second set of memory page tables is used for address conversion in a process of accessing the memory across nodes, and a last-level page table in the second set of memory page tables may be referred to as a UCI page table (UCI PT). For ease of distinguishing, an entry in the page table is referred to as a PTE, and an entry in the UCI page table is referred to as a UCIPTE. In this embodiment of this application, a VA includes a directory (Dir) field, and different page tables are indexed by using different values of the Dir field in the VA. For example, if a value of the Dir field is within a first range, the last-level page table in the first set of memory page tables is indexed. If a value of the Dir field is within a second range, the last-level page table in the second set of memory page tables is indexed.

Figure 15:
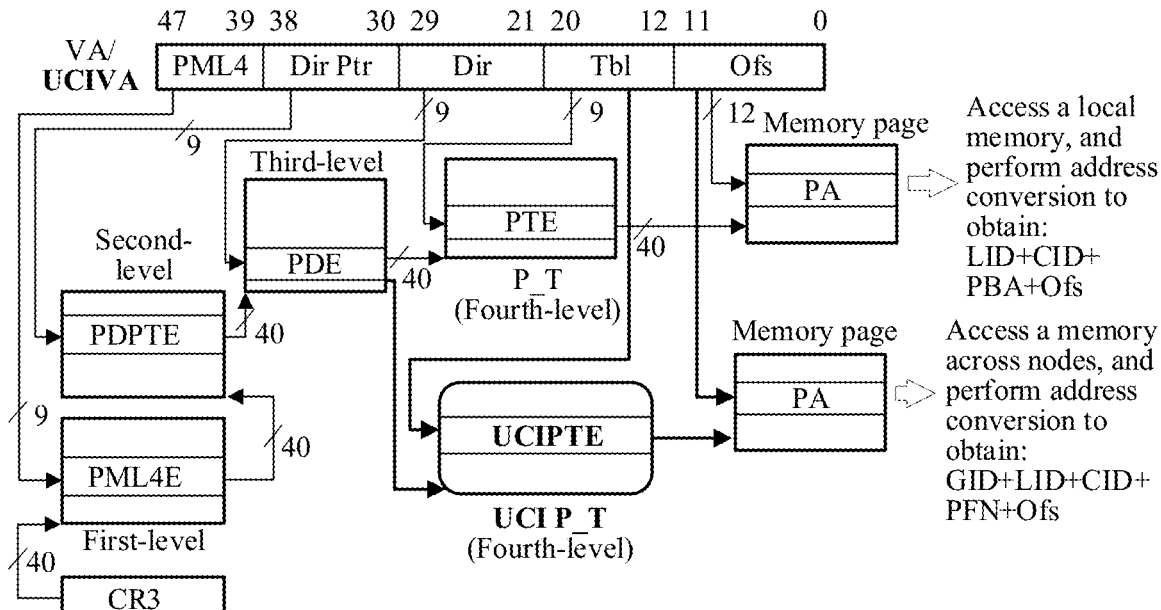
FIG. 15 is a schematic flowchart of address conversion according to an embodiment of this application.

The following describes address conversion in embodiments of this application again with reference to FIG. 15. FIG. 15 is a schematic flowchart of address conversion according to an embodiment of this application. Referring to FIG. 15, it is assumed that a first memory page table is a four-level page table, and a memory access request initiated by an application program carries a to-be-converted first VA and a CR3 field. For example, the first VA includes 48 bits in total, and the first VA includes four index fields and one address offset field (Ofs). The four index fields are respectively a PML4 field, a directory pointer (Dir Ptr) field, a Dir field, and a Tbl (table) field. The CR3 field carries a PA of a first-level page table.

When accessing a local memory, a first MMU queries the first-level page table based on the PA of the first-level page table in the CR3, to obtain, from the first-level page table, a page directory entry PML4E corresponding to the PML4 field, and a PA that is of a second-level page table and that is recorded in the PML4E. The first MMU queries the second-level page table based on the PA of the second-level page table, to obtain, from the second-level page table, a page directory entry PDPTE corresponding to the Dir Ptr field, and a PA that is of a third-level page table and that is recorded in the PDPTE. The first MMU queries the third-level page table based on the PA of the third-level page table, to obtain, from the third-level page table, a page directory entry PDE corresponding to the Dir field, and a PA that is of a fourth-level page table and that is recorded in the PDE. The fourth-level page table used during the access to the local memory belongs to a first set of memory page tables. The first MMU queries the fourth-level page table (PT) based on the PA of the fourth-level page table, to obtain, from the fourth-level page table, a PTE corresponding to the Tbl field, where the PTE is a first PTE. When the first PTE indicates that routing is performed via a SAD, the first MMU obtains a page base_address (PBA) from the first PTE. When the first PTE indicates that routing is performed via UCI, the first MMU obtains a PBA and first routing information from the first PTE. The first MMU concatenates the PBA and the offset, to obtain a PA of memory data. The first routing information includes an identifier (for example, a LID, optionally) of a processor and an identifier (for example, a CID) of an HA. In an example, when the local memory is accessed and routing is performed via the UCI, in an implementation, the first MMU can obtain LID+CID+PBA+ offset by querying the first memory page table.

When a memory is accessed across nodes, a difference from accessing the local memory is that, after obtaining, from a third-level page table, a page directory entry PDE corresponding to the Dir field, a first MMU obtains a PA that is of a fourth-level page table and that is recorded in the PDE. The fourth-level page table belongs to a second set of memory page tables. The first MMU queries the fourth-level page table (UCI PT) based on the PA of the fourth-level page table, to obtain, from the fourth-level page table, a first UCIPTE corresponding to the Tbl field. The first UCIPTE records first routing information and a PFN. The first MMU obtains, based on a first indication bit (where in an example, a value of the first indication bit is 1) in the first UCIPTE, the first routing information and the PFN in the first UCIPTE. The first MMU concatenates the PFN and the offset, and routes PFN+offset based on the first routing information. Optionally, the first routing information includes a GID of one computing node, a LID of one processor, and a CID of one HA. In an example, when the memory is accessed across nodes, in an implementation, the first MMU can obtain GID+LID+CID+PFN+offset by querying the first memory page table.

It should be noted that, in the foregoing embodiments, extension of the 64-bit CR3, extension of the 64-bit PDPTE/ PDE, and extension of the 64-bit PTE are used as examples for description. During an example implementation, a 32-bit CR3, PDPTE/PDE, PTE, and the like may alternatively be extended, so that the MMU obtains routing information of each PA in a process of performing address conversion on the VA.

Step 403: The first MMU sends a second memory access request to the target module indicated by the first routing information, where the second memory access request carries the first PA, and the second memory access request indicates the target module to obtain the memory data based on the first PA and return the memory data to the first core.

In this embodiment of this application, after obtaining the first query result by querying the first memory page table, the first MMU sends the second memory access request to the target module indicated by the first routing information, where the second memory access request carries the first PA.

When the local memory is accessed, if the target module is the first HA of the first processor, the first MMU sends the second memory access request to the first HA through an internal connection line of the first processor. After receiving the second memory access request, the first HA obtains, based on the first PA, the memory data from the memory space managed by the first HA, and returns the memory data to the first core. If the target module is the second HA of the second processor, the first MMU sends the second memory access request to the second HA through a UPI interface of the first processor. After receiving the second memory access request, the second HA obtains, based on the first PA, the memory data from memory space managed by the second HA, and returns the memory data to the first core. Optionally, the second HA returns the memory data to the first core through a UPI interface of the second processor.

When the memory is accessed across nodes, the target module is the third HA of the third processor in the second computing node. The first MMU sends the second memory access request to the third HA through an interconnection port (for example, a port in a network interface card) between computing nodes. After receiving the second memory access request, the third HA obtains, based on the first PA, the memory data from memory space managed by the third HA, and returns the memory data to the first core. Optionally, the third HA returns the memory data to a core corresponding to the third HA, and the core returns the memory data to the first core through the interconnection port between the computing nodes. Optionally, the memory space managed by the third HA includes the first memory space, and the third HA obtains the memory data from the first memory space.

It can be learned from the foregoing descriptions that, after obtaining the memory access request initiated by the application program, the first core first queries the TLB, and when the TLB miss occurs, the first core sends the first memory access request to the first MMU. Optionally, if the first page table entry corresponding to the VA is buffered in the TLB, it indicates a TLB hit. In an example, the first core does not need to send the first memory access request to the first MMU, and the first core obtains the memory data based on information recorded in the page table entry. For example, when the local memory is accessed, the first page table entry in the TLB records the PBA and the routing information (for example, local LID+CID) of the first PA, the PBA and the offset are concatenated into the first PA. The first core obtains the memory data of the first PA from the local memory via the HA indicated by the routing information. When the memory is accessed across nodes, the first page table entry in the TLB records the PFN and the routing information (for example, a remote GID+LID+CID) of the first PA, and the PFN and the offset are concatenated into the first PA. The first core routes the first PA to the HA indicated by the routing information. The HA obtains, based on the PA, the memory data from the memory space managed by the HA, and returns the memory data to the first core.

In embodiments described above, the second computing node provides an accessible memory for the first computing node, and the first computing node can access the memory of the second computing node across nodes. Alternatively, the first computing node provides an accessible memory for the second computing node, and the second computing node can also access the memory of the first computing node across nodes. For example, the second computing node includes a fifth processor (which may be the same as the third processor), and the fifth processor includes a second MMU and a second core. The second MMU receives a third memory access request sent by the second core, where the third memory access request carries a second VA. The second MMU queries a second memory page table based on the second VA, to obtain a second query result, where the second query result includes third routing information and a second PA. The second MMU sends a fourth memory access request to an HA indicated by the third routing information, where the fourth memory access request carries the second PA, and the fourth memory access request indicates the HA to obtain memory data corresponding to the second PA, and return the obtained memory data to the second core. An example implementation process is similar to a process of step 401 to step 403. Details are not described herein again.

It should be noted that a location of the MMU in the processor is not limited in embodiments of this application. The MMU may be located next to the core, or may be located next to the HA, to improve efficiency of querying the memory page table. Optionally, one core corresponds to one MMU, or one processor has one MMU pool, where the MMU pool includes a plurality of MMUs. The plurality of MMUs provide address conversion functions for each core of the processor.

The foregoing describes a process in which the processor performs memory access, namely, a process in which the core of the processor performs memory access via the NM, the HA, and the like. In this process, the MMU can obtain the routing information in the address conversion process. Optionally, in a process of performing memory access, a peripheral of the processor can also obtain routing information in an address conversion process via a system memory management unit (SMMU) in the processor. For example, a memory page table that is used by the SMMU to perform address conversion also records the routing information. A principle of performing address conversion by the SMMU is similar to a principle of performing address conversion by the MMU. Details are not described herein. It should be noted that, in this specification, for ease of distinguishing, a VA used by the peripheral to perform memory access is referred to as an IOVA. In an example, the MMU is configured to perform address conversion on the VA, and the SMMU is configured to perform address conversion on the IOVA.

Figure 16:
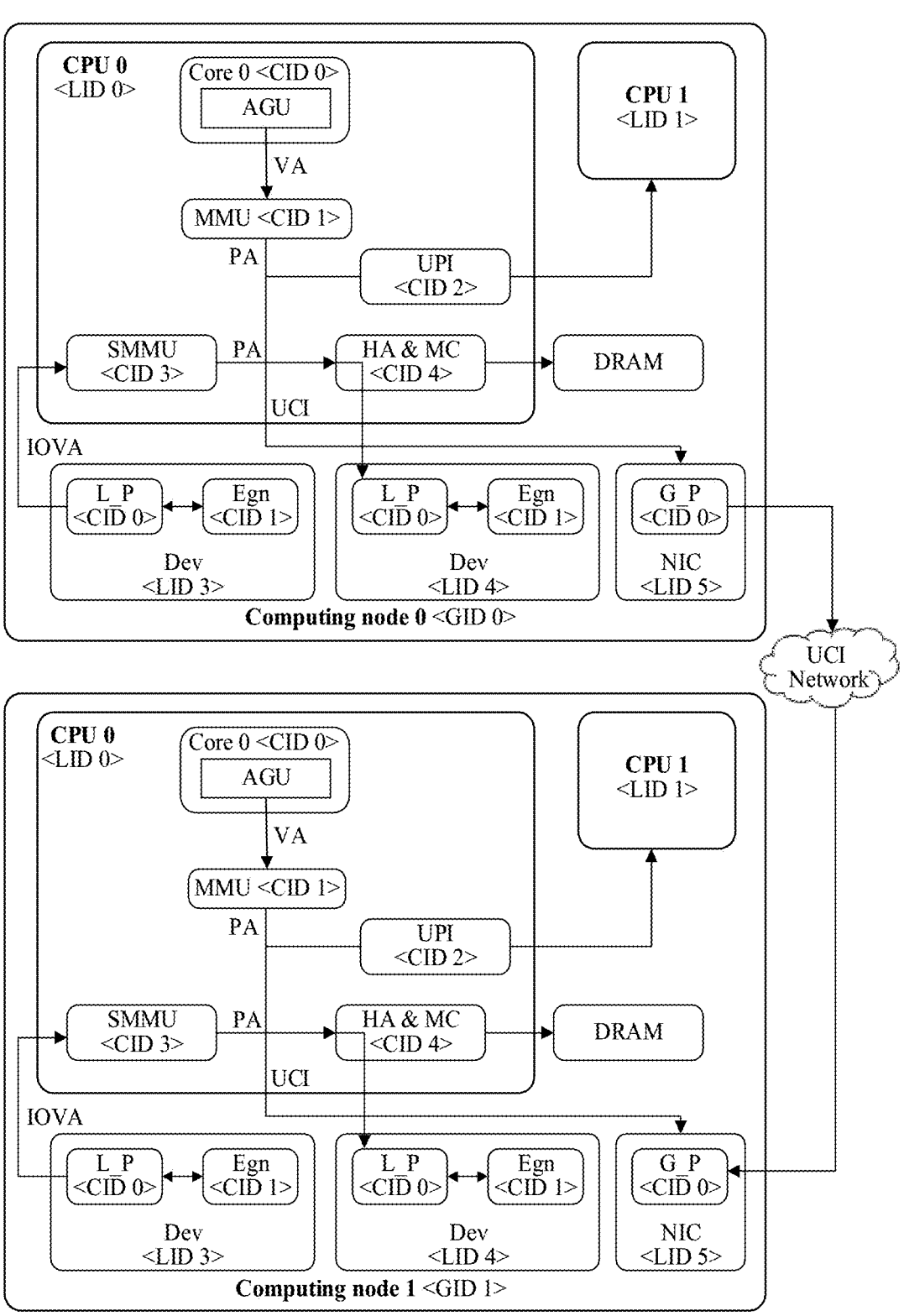
FIG. 16 is a schematic diagram of an architecture of another computing system according to an embodiment of this application.

FIG. 16 is a schematic diagram of an architecture of another computing system according to an embodiment of this application. Referring to FIG. 16, the computing system includes a computing node 0, a computing node 1, and the like. Each computing node is identified by using a GID. Processors (such as CPUs) and peripherals (such as Devs and NICs), and the like in the computing nodes are identified by using LIDs, and components in the processors and components in the peripherals are identified by using CIDs. The computing nodes may interact, based on GID+LID+CID routing information, with each other via a G_P, a UCI network, and the like. The processors, the peripherals, and the like in the computing nodes may interact, based on LID+CID routing information, with each other via an L_P and the like. It can be seen from FIG. 16 that, PAs obtained by an MMU and an SMMU in processes of performing address conversion do not need to be decoded and routed via a SAD, so that a memory access process is simpler and faster. In addition, a UCI routing manner is used, so that complex protocol conversion is not needed, and communication efficiency is improved.

In conclusion, in embodiments of this application, the routing information is added to the memory page table, so that the MMU queries, in the process of performing address translation on the VA, the memory page table to obtain the routing information. In this way, after querying the memory page table and obtaining the PA, the MMU may directly route the PA based on the routing information, and the SAD is not needed for further decoding the PA. In an example, in this solution, a set of memory page tables having the routing information is designed. This reduces complexity of memory access, and supports cross-node access to a memory.

Figure 17:
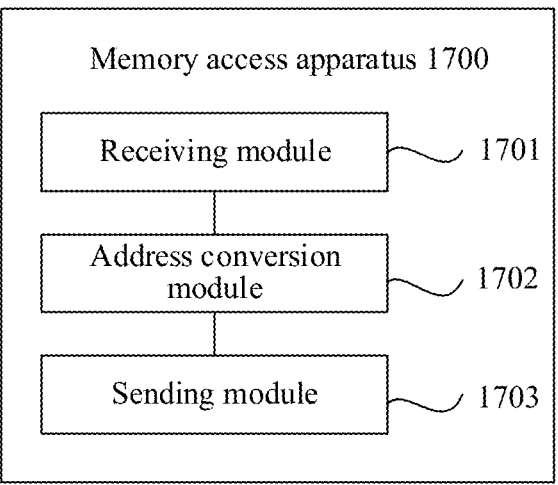
FIG. 17 is a schematic diagram of a structure of a memory access apparatus according to an embodiment of this application.

FIG. 17 is a schematic diagram of a memory access apparatus according to an embodiment of this application. The memory access apparatus may be implemented as some or all of a computer device by using software, hardware, or a combination thereof. The computer device may be any computing node shown in FIG. 1 to FIG. 3. In this embodiment of this application, a computing system includes a first computing node, the first computing node includes a first processor, the first processor includes a first MMU and a first core, and the apparatus is used in the first MMU. Referring to FIG. 17, the apparatus includes a receiving module 1701, an address conversion module 1702, and a sending module 1703.

The receiving module 1701 is configured to receive a first memory access request sent by the first core, where the first memory access request carries a first VA.

The address conversion module 1702 is configured to query a first memory page table based on the first VA, to obtain a first query result, where the first query result includes first routing information and a first PA.

The sending module 1703 is configured to send a second memory access request to a target module indicated by the first routing information, where the second memory access request carries the first PA, and the second memory access request indicates the target module to obtain memory data based on the first PA and return the memory data to the first core.

Optionally, the target module is an HA in the first computing node.

Optionally, the target module is a first HA of the first processor, and the first routing information includes an identifier of the first HA.

Optionally, the first computing node further includes a second processor, the target module is a second HA of the second processor, and the first routing information includes an identifier of the second processor and an identifier of the second HA.

Optionally, the address conversion module 1702 includes a first page table query submodule, configured to query the first memory page table for a first PTE corresponding to the first VA; a first obtaining submodule, configured to obtain first indication information in the first PTE, where the first indication information indicates that a local memory is accessed, and the first PTE records the first routing information; a second obtaining submodule, configured to obtain a physical page frame number and the first routing information in the first PTE based on the first indication information; and a first concatenating submodule, configured to concatenate the physical page frame number and an address offset field in the first VA, to obtain the first PA.

Optionally, the computing system further includes a second computing node, the second computing node includes a third processor, and the second computing node stores the memory data.

The target module is a third HA of the third processor, and the first routing information includes an identifier of the second computing node, an identifier of the third processor, and an identifier of the third HA.

Optionally, the second computing node includes first memory space. The first memory space includes a memory that is provided by the second computing node for the first computing node, and the first memory space stores the memory data.

Optionally, the address conversion module 1702 includes a second page table query submodule, configured to query the first memory page table for a first PTE corresponding to the first VA; a third obtaining submodule, configured to obtain second indication information in the first PTE, where the second indication information indicates that a memory is accessed across nodes, and the first PTE records the first routing information; a fourth obtaining submodule, configured to obtain a physical page frame number and the first routing information in the first PTE based on the second indication information; and a second concatenating submodule, configured to concatenate the physical page frame number and an address offset field in the first VA, to obtain the first PA.

Optionally, the first computing node further includes a fourth processor, the first memory page table includes a first-level page table, the first memory access request further carries a PA of the first-level page table and second routing information, the second routing information indicates a fourth HA of the fourth processor, and memory space managed by the fourth HA stores the first-level page table.

The address conversion module 1702 includes a first-level page table query submodule, configured to route the PA of the first-level page table to the fourth HA indicated by the second routing information, to query, by using the fourth HA, the first-level page table for an entry corresponding to the first VA.

Optionally, the first memory access request includes a CR3 field, and the CR3 field carries the PA of the first-level page table and the second routing information.

Optionally, the address conversion module 1702 further includes a fifth obtaining submodule, configured to obtain fourth indication information in the CR3 field, where the fourth indication information indicates that the CR3 field carries the second routing information; and a sixth obtaining submodule, configured to obtain the second routing information in the CR3 field based on the fourth indication information.

Optionally, the first memory page table is a multi-level page table, and each page directory entry of each level of page table other than a last-level page table in the multi-level page table records routing information that indicates a storage location of a next-level page table.

Optionally, each page directory entry of each level of page table other than the last-level page table in the multi-level page table further records fifth indication information, and the fifth indication information indicates that a corresponding page directory entry records routing information that indicates the storage location of the next-level page table.

In this embodiment of this application, the routing information is added to the memory page table, so that the MMU queries, in a process of performing address translation on the VA, the memory page table to obtain the routing information. In this way, after querying the memory page table and obtaining the PA, the MMU may directly route the PA based on the routing information, and a SAD is not needed for further decoding the PA. In an example, in this solution, a set of memory page tables having the routing information is designed. This reduces complexity of memory access.

It should be noted that, when the memory access apparatus provided in the foregoing embodiment performs memory access, division into the foregoing functional modules is merely used as an example for description. During actual application, the foregoing functions may be allocated to different functional modules for implementation based on requirements. In an example, an internal structure of the apparatus is divided into different functional modules, to implement all or some of the functions described above. In addition, the memory access apparatus provided in the foregoing embodiment and the memory access method embodiments pertain to a same concept. For a an example implementation process, refer to the method embodiments. Details are not described herein again.

All or some of the foregoing embodiments may be implemented by using software, hardware, firmware, or any combination thereof. When the software is used to implement the foregoing embodiments, all or some of the foregoing embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium that can be accessed by the computer, or a data storage device such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, a solid-state drive (SSD)). It should be noted that the computer-readable storage medium mentioned in embodiments of this application may be a non-volatile storage medium, or in an example, may be a non-transitory storage medium.

It should be understood that "at least one" mentioned in this specification means one or more, and "a plurality of" means two or more. In the descriptions of embodiments of this application, unless otherwise specified, "/" means "or". For example, A/B may represent A or B. In this specification, "and/or" describes only an association relationship between associated objects, and represents that three relationships may exist. For example, A and/or B may represent the following three cases: Only A exists, both A and B exist, and only B exists. In addition, to clearly describe the technical solution in embodiments of this application, terms such as "first" and "second" are used in embodiments of this application to distinguish between same items or similar items that have basically same functions and purposes. A person skilled in the art may understand that the terms such as "first" and "second" do not limit a quantity and an execution sequence, and the terms such as "first" and "second" do not indicate a definite difference.

It should be noted that information (including but not limited to user equipment information, user personal information, and the like), data (including but not limited to data used for analysis, stored data, displayed data, and the like), and signals in embodiments of this application are all authorized by a user or fully authorized by all parties, and collection, use, and processing of related data need to comply with related laws, regulations, and standards of related countries and regions. For example, the memory data, the routing information, and the like in embodiments of this application are all obtained based on full authorization.

The foregoing descriptions are embodiments provided in this application, but are not intended to limit this application. Any modification, equivalent replacement, or improvement made without departing from the spirit and principle of this application shall fall within the protection scope of this application.

The invention claimed is:

1. A memory access method implemented by a computing system, wherein the memory access method comprises:

receiving, by a first memory management unit (MMU) of a first computing node of the computing system, a first memory access request from a first core of the first computing node, wherein the first memory access request carries a first virtual address (VA);

querying, by the first MMU, a first memory page table based on the first VA to obtain a first query result, wherein the first query result comprises first routing information and a first physical address (PA); and sending, by the first MMU, a second memory access request to a target module indicated by the first routing information, wherein the second memory access request carries the first PA, and wherein the second memory access request instructs the target module to obtain memory data based on the first PA and to return the memory data to the first core.

2. The memory access method of claim 1, wherein the target module is a home agent (HA) in the first computing node.

3. The memory access method of claim 2, wherein the target module is a first HA of a first processor in the first computing node, and wherein the first routing information comprises a first identifier of the first HA.

4. The memory access method of claim 2, wherein the target module is a second HA of a second processor of the first computing node, and wherein the first routing information comprises a first identifier of the second processor and a second identifier of the second HA.

5. The memory access method of claim 2, further comprising:

further querying, by the first MMU, the first memory page table for a first page table entry (PTE) corresponding to the first VA;

obtaining, by the first MMU, first indication information in the first PTE, wherein the first indication information indicates that a local memory is accessed, and wherein the first PTE records the first routing information;

obtaining, by the first MMU, a physical page frame number and the first routing information in the first PTE based on the first indication information; and concatenating, by the first MMU, the physical page frame number and an address offset field in the first VA to obtain the first PA.

6. The memory access method of claim 1, further comprising storing, by a second computing node of the computing system, the memory data, wherein the target module is a third HA of a third processor of the second computing node, and wherein the first routing information comprises a first identifier of the second computing node, a second identifier of the third processor, and a third identifier of the third HA.

7. The memory access method of claim 6, further comprising:

further querying, by the first MMU, the first memory page table for a first PTE corresponding to the first VA;

obtaining, by the first MMU, second indication information in the first PTE, wherein the second indication information indicates that a memory is accessed across nodes, and wherein the first PTE records the first routing information;

obtaining, by the first MMU, a physical page frame number and the first routing information in the first PTE based on the second indication information; and concatenating, by the first MMU, the physical page frame number and an address offset field in the first VA to obtain the first PA.

8. The memory access method of claim 1, further comprising:

storing, by a first HA of a fourth processor of the first computing node, a first-level page table in a memory space; and routing, by the first MMU, a second PA of the first-level page table to the first HA indicated by second routing information, wherein the first memory page table comprises the first-level page table, wherein a third memory access request carries the second PA, and wherein the second routing information indicates a first HA, and wherein querying the first memory page table comprises querying, using the first HA, the first-level page table for an entry corresponding to the first VA.

9. The memory access method of claim 8, wherein the first memory access request comprises a control register (CR3) field, and wherein the CR3 field carries the second PA and the second routing information.

10. The memory access method of claim 9, wherein before the routing, the memory access method further comprises:

obtaining, by the first MMU, fourth indication information in the CR3 field, wherein the fourth indication information indicates that the CR3 field carries the second routing information; and obtaining, by the first MMU, the second routing information in the CR3 field based on the fourth indication information.

11. The memory access method of claim 1, wherein the first memory page table is a multi-level page table, and wherein each page directory entry of each level of page table other than a last-level page table in the multi-level page table records routing information that indicates a storage location of a next-level page table.

12. The memory access method of claim 11, wherein each page of the directory entry of each level of the page table other than the last-level page table further records fifth indication information, and wherein the fifth indication information indicates that a corresponding page directory entry records the routing information that indicates the storage location of the next-level page table.

13. A computing system, comprising:

a first computing node comprising:

a first processor;

a first core in the first processor and configured to send a first memory access request, wherein the first memory access request carries a first virtual address (VA); and a first memory management unit (MMU) in the first processor and configured to:

receive the first memory access request;

query a first memory page table based on the first VA, to obtain a first query result, wherein the first query result comprises first routing information and a first physical address (PA); and send a second memory access request to a target module indicated by the first routing information, wherein the second memory access request carries the first PA, and wherein the second memory access request instructs the target module to obtain memory data based on the first PA and return the memory data to the first core.

14. The computing system of claim 13, wherein the first computing node further comprises a home agent (HA), and wherein the target module is the HA.

15. The computing system of claim 14, wherein the first processor further comprises a first HA, wherein the first HA comprises an identifier, wherein the target module is the first HA, and wherein the first routing information comprises the identifier.

16. The computing system of claim 14, wherein the first computing node further comprises a second processor comprising a second HA, wherein the second processor comprises a first identifier, wherein the second HA comprises a second identifier, wherein the target module is the second HA, and wherein the first routing information comprises the first identifier and the second identifier.

17. The computing system of claim 14, wherein the first MMU is further configured to:

query the first memory page table for a first page table entry (PTE) corresponding to the first VA;

obtain first indication information in the first PTE, wherein the first indication information indicates that a local memory is accessed, and wherein the first PTE records the first routing information;

obtain a physical page frame number and the first routing information in the first PTE based on the first indication information; and concatenate the physical page frame number and an address offset field in the first VA, to obtain the first PA.

18. The computing system of claim 13, further comprising a second computing node comprising a third processor and a first identifier, wherein the third processor comprises a third home agent (HA) and a second identifier, wherein the third HA comprises a third identifier, wherein the second computing node stores the memory data, wherein the target module is the third HA, and wherein the first routing information comprises the first identifier, the second identifier, and the third identifier.

19. The computing system of claim 18, wherein the first MMU is further configured to:

query the first memory page table for a first PTE corresponding to the first VA;

obtain second indication information in the first PTE, wherein the second indication information indicates that a memory is accessed across nodes, and wherein the first PTE records the first routing information;

obtain a physical page frame number and the first routing information in the first PTE based on the second indication information; and concatenate the physical page frame number and an address offset field in the first VA, to obtain the first PA.

20. A non-transitory computer-readable medium comprising computer-executable instructions that when executed by at least one processor, cause a computing node to:

receive, by a first memory management unit (MMU), a first memory access request from a first core, wherein the first memory access request carries a first virtual address (VA);

query, by the first MMU, a first memory page table based on the first VA, to obtain a first query result, wherein the first query result comprises first routing information and a first physical address (PA); and send, by the first MMU, a second memory access request to a target module indicated by the first routing information, wherein the second memory access request carries the first PA, and wherein the second memory access request instructs the target module to obtain memory data based on the first PA and to return the memory data to the first core.

* * * * *